April 26, 1960     E. T. HILLBERG     2,934,228
PICKUP VEHICLE

Filed Jan. 7, 1957     2 Sheets-Sheet 1

ERNEST T. HILLBERG,
INVENTOR.

BY HIS ATTORNEYS

Harris, Kiech, Foster & Harris.

April 26, 1960 E. T. HILLBERG 2,934,228
PICKUP VEHICLE
Filed Jan. 7, 1957 2 Sheets-Sheet 2
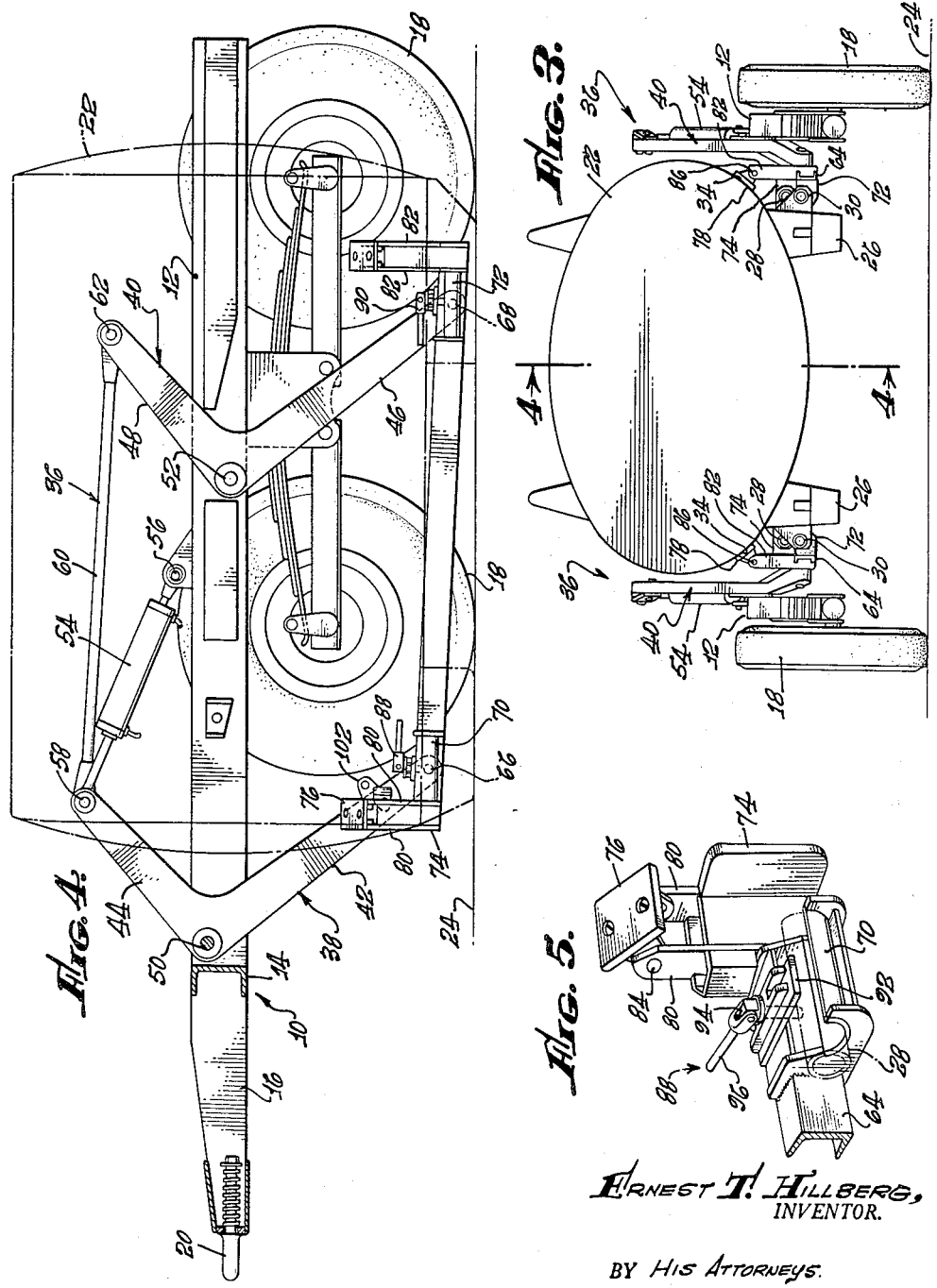
Ernest T. Hillberg,
INVENTOR.
BY HIS ATTORNEYS.
Harris, Kiech, Foster & Harris United States Patent Office 2,934,228
Patented Apr. 26, 1960

2,934,228

PICKUP VEHICLE

Ernest T. Hillberg, Anaheim, Calif., assignor, by mesne assignments, to the United States of America as represented by the Secretary of the Army Application January 7, 1957, Serial No. 632,849

13 Claims. (Cl. 214—390)

The present invention relates in general to a cargo transporting vehicle and, more particularly, to a vehicle which includes a chassis or frame, a carrier for the load to be transported, and pickup means for lifting the load carrier into a traveling position relative to the chassis or frame for transportation from one location to another. Still more specifically, the present invention relates to a pickup vehicle of the general type disclosed in reissue Patent No. Re. 24,227 of October 16, 1956, to Clarence S. Black.

Generally speaking, the present invention contemplates a vehicle having a U-shaped chassis or frame provided with side frame members or rails rigidly interconnected at one end and adapted to receive the load carrier therebetween upon maneuvering of the chassis into position around the load carrier so that the latter is embraced by the side rails. Preferably, the cargo carrying, pickup vehicle of the invention comprises a trailer having a U-shaped, wheeled chassis adapted to be backed into position around the load carrier preparatory to picking it up from the ground surface, or other surface, on which it rests. The load carrier itself may be of any suitable type, depending upon the nature of the articles, material, or the like, to be transported thereby. For example, the load carrier may be a hopper, bin, pallet, tank, or any other load carrying container or device, a tank being considered hereinafter for convenience.

The aforementioned Black reissue patent discloses a pickup vehicle which includes two lifting means or lifting mechanisms respectively mounted on the two side rails and movable between extended and retracted positions in generally vertical planes, these lifting mechanisms being engageable with a load carrier resting on the ground, or other surface, between the side rails when they are in their extended positions, and lifting the load carrier into its traveling position between the side rails as they move generally vertically from their extended positions to their retracted positions. Means is provided for interlocking the side rails or the frame or chassis together adjacent the free ends thereof through the load carrier as the latter reaches its traveling position, i.e., as the lifting mechanisms reach their retracted positions. This interlock or cross lock between the side rails when the load carrier reaches its traveling position converts the frame of the vehicle from a U-shaped frame to a rectangular one automatically to produce greater frame rigidity and strength in transit, thereby increasing the load carrying capacity of the frame materially.

A primary object of the present invention is to provide means for automatically bracing the side rails through the load carrier as the lifting mechanisms initially engage the load carrier and while the lifting mechanisms are still in their extended positions, instead of delaying the automatic cross brace between the side rails until the lifting mechanisms reach their retracted positions. Consequently, the side rails are cross braced to convert the chassis to a rectangular frame from the instant that the lifting mechanisms start to lift the load carrier into its traveling position. This provides the chassis with maximum strength and rigidity during the lifting operation, thereby materially increasing the load lifting capacity thereof and permitting the transportation of heavier loads as compared to the case where the automatic side-rail cross brace does not occur until the load carrier reaches its traveling position.

More particularly, an important object of the invention is to provide two bracing means engageable with the load carrier upon engagement of the lifting mechanisms with the load carrier for rigidly cross bracing the side rails through the load carrier automatically upon initiation of lifting of the load carrier by the lifting mechanisms.

A further object of the invention is to provide a pickup vehicle wherein the two bracing means are carried by the lifting mechanisms, respectively, and are engageable with the load carrier on opposite sides thereof.

Another object is to provide a vehicle wherein the lifting mechanisms respectively include lifting members which are movable generally vertically relative to the respective side rails, and which respectively include lifting elements respectively insertable under and engageable with downwardly-facing lifting abutments on, or provided by, the load carrier.

Still another object is to provide bracing means respectively including bracing elements mounted on the respective lifting members, these bracing elements being spaced laterally from the lifting elements and being engageable with the load carrier on opposite sides thereof, or more particularly, being respectively engageable with bracing abutments on, or provided by, the load carrier.

The positional relation between the bracing elements and the lifting elements and the directions in which the bracing elements face are so related that the bracing elements automatically engage the load carrier as the lifting elements engage it to cross brace the side rails through the load carrier and the vertically movable lifting members. In the construction illustrated hereinafter, the bracing elements are located above the lifting elements and face transversely inwardly to achieve the desired result.

A further object of the invention is to mount the lifting members on the side rails for generally vertical movement relative thereto in such a manner that the lifting members are restrained against lateral or transverse movement to permit rigidly bracing the side rails automatically through the lifting members and the load carrier when the lifting members are in their extended positions. Preferably, this is accomplished by simple pivotal connections between the lifting members and the side rails, such pivotal connections providing transverse pivot axes for the lifting members.

Another object is to provide bracing elements which are flexibly, e.g., pivotally, mounted on the respective lifting members so that they will automatically position themselves relative to bracing abutments on the load carrier of varying contour. With such flexibly mounted bracing elements, the bracing abutments on the load carrier may merely be the sides of the load carrier, although the load carrier may be provided with special bracing abutments if desired.

The foregoing objects, advantages, features and results of the present invention, together with various other objects, advantages, features and results thereof which will be apparent to those skilled in the art to which the invention relates in the light of this disclosure, may be obtained with the exemplary embodiment described in detail hereinafter and illustrated in the accompanying drawings, in which:

Fig. 3 is a rear elevational view of the vehicle with the load carrier in its traveling position;

Fig. 4 is an enlarged sectional view taken along the arrowed line 4—4 of Fig. 3 and showing one of the lifting mechanisms of the vehicle in its extended position, the load carrier being shown in broken lines;

Fig. 5 is a further enlarged, fragmentary, perspective view of a portion of one of the lifting mechanisms of the invention.

Figure 1:
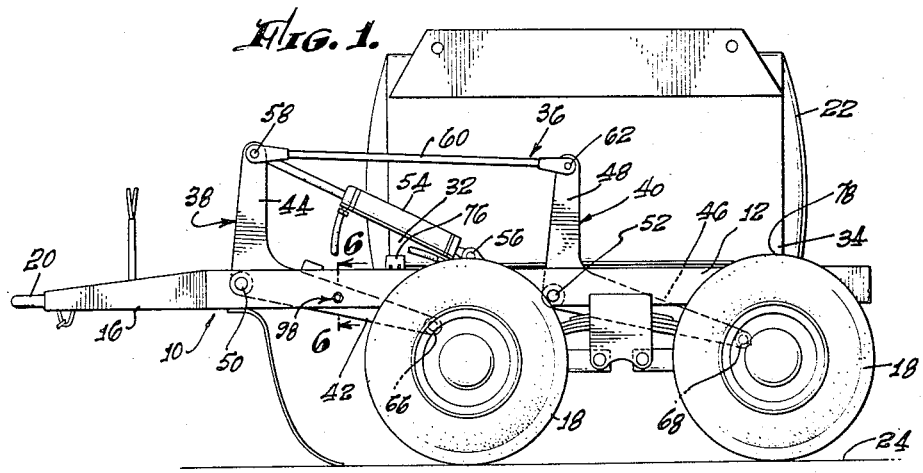
Fig. 1 is a side elevational view of a pickup vehicle embodying the invention with a load carrier thereof in its traveling position.
Figure 2:
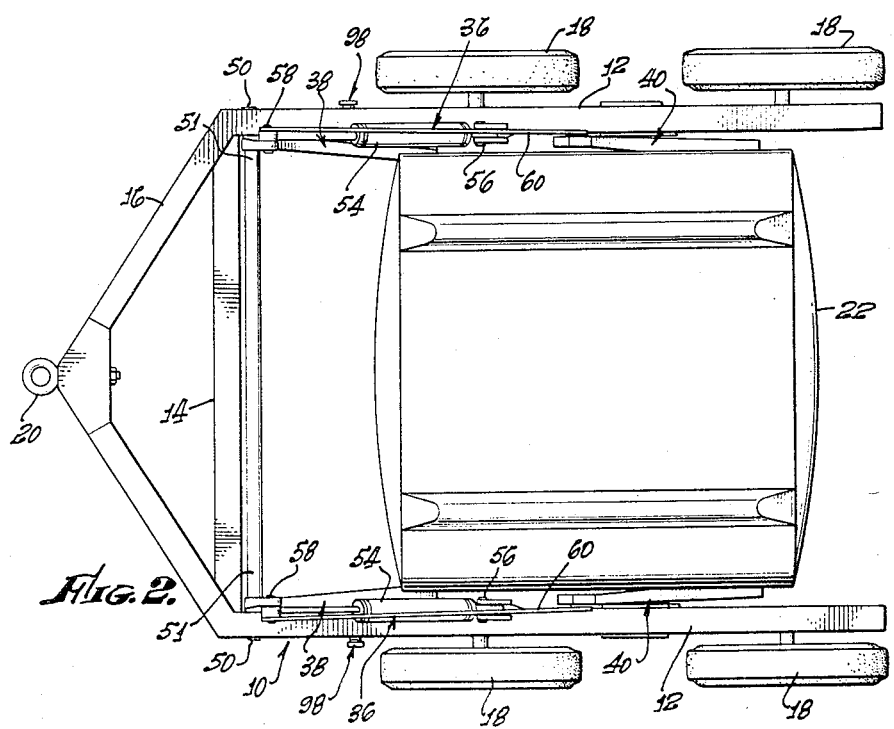
Fig. 2 is a plan view of the vehicle with the load carrier in tis traveling position.

In the drawings, the numeral 10 designates a generally U-shaped chassis or frame having laterally or transversely spaced, generally parallel, side frame members or rails 12 interconnected at one end of the frame by a transverse frame member 14 and a V-shaped frame member 16. The frame members 14 and 16 cooperate to form a triangular framework rigidly interconnecting the side rails 12 at one end of the frame.

In the particular construction illustrated, the vehicle of the invention constitutes a U-shaped trailer, the frame 10 being carried by ground-engaging wheels 18 suitably mounted on the side rails 12 intermediate the forward, or fixed ends thereof and the rearward, or free ends thereof. The V-shaped frame member 16 is provided with a suitable trailer hitch 20 at the apex thereof.

The pickup vehicle of the invention includes a load carrier 22 for the articles, material, or the like, to be transported. In the particular construction shown, the load carrier 22 is a tank adapted to contain a material to be transported. However, it will be understood that the load carrier 22 may take other forms, such as a bin, or the like.

As will be apparent, the transverse spacing of the side rails 12 is so related to the width of the tank 22 that the tank is receivable between the side rails when the tank is resting on a ground surface, or other surface, 24. If desired, the tank may be provided with feet 26 which contact the surface 24 when the tank is resting thereon. With the particular construction illustrated, wherein the vehicle is a trailer, the trailer may be backed around the tank 22 so that the tank is received between the side rails 12.

The tank is provided along opposite sides thereof with longitudinally extending front and rear rails 28 and 30, which may merely be lengths of pipe suitably secured to the tank. For reasons which will become apparent, the front rails 28 are at a higher elevation than the rear rails 30. The rails 28 and 30 provide the tank 22 with downwardly-facing lifting abutments, such abutments being formed by the lower surfaces of the rails. The sides of the tank 22, in the particular construction illustrated, provide transversely outwardly facing bracing abutments 32 and 34 spaced upwardly from the downwardly facing lifting abutments formed by the lower surfaces of the rails 28 and 30. It will be understood that while the bracing abutments 32 and 34 are provided by the sides of the tank 22 in the particular construction illustrated, they may be otherwise provided.

The side rails 12 respectively carry generally vertically movable lifting means or mechanisms 36 each of which includes front and rear lifting members 38 and 40. The front lifting members 38 are provided with front lifting arms 42 and front actuating arms 44, and the rear lifting members 40 are provided with rear lifting arms 46 and rear actuating arms 48. The front and rear lifting arms 42 and 46 are rendered generally vertically movable between lower, extended positions and upper, retracted positions by mounting the front and rear lifting members 38 and 40 on the respective side rails 12 by means of front and rear transverse pivots 50 and 52, the pivots 50 being formed by the ends of a cross shaft 51. These pivots permit generally vertical swinging movement of the lifting arms 42 and 46 between their extended and retracted positions, but restrain the lifting arms against movement in other directions. Thus, the pivots 50 and 52 permit only generally vertical movement of the lifting arms 42 and 46, but rigidly connect the lifting members 38 and 40 to the side rails 12 with respect to movement of the lifting arms in any other directions.

The lifting members 38 and 40 are moved between their extended and retracted positions by hydraulic units 54 pivotally connected to the side rails 12 by pivots 56 and pivotally connected to the front actuating arms 44 by pivots 58. Links 60 are pivotally connected to the front actuating arms 44 by the pivots 58 and to the rear actuating arms 48 by pivots 62. It will be apparent that with this construction, extension of the hydraulic units 54 results in movement of the lifting members 38 and 40 into their upper, retracted positions, while contraction of the hydraulic units results in movement of the lifting members into their lower, extended positions. The hydraulic units 54 may be controlled by any suitable means, not shown.

The outer or free ends of the front and rear lifting arms 42 and 46 on the respective sides of the vehicle are interconnected by longitudinally extending rails 64, respectively. Each rail 64 is connected at its front end to the corresponding front lifting arm 42 by a pivot 66, and is connected to the corresponding rear lifting arm 46 by a pivot 68. Thus, the rails 64 are adapted to pivot relative to the respective front and rear lifting arms 42 and 46 as the lifting arms are moved generally vertically between their extended or retracted positions by pivoting of the front and rear lifting members 38 and 40.

Each rail 64 is provided adjacent its front and rear ends with front and rear lifting elements 70 and 72, best seen in Figure 5. In the particular construction illustrated, the front and rear lifting elements 70 and 72 have the form of upwardly-facing hooks or cradles and are insertable under the front and rear rails 28 and 30, respectively, on the tank 22 for engagement with the downwardly-facing lifting abutments formed by the lower sides of such rails. As will be apparent, by inserting the front and rear lifting elements 70 and 72 under the front and rear rails 28 and 30, respectively, and subsequently pivoting the front and rear lifting members 38 and 40 to move the front and rear lifting arms 42 and 46 generally vertically upwardly into their retracted positions, the tank 22 may be lifted into a traveling position between the side rails 12, as shown in Figs. 1 and 3 of the drawings in particular. In order to insert the front and rear lifting elements 70 and 72 under the front and rear lifting rails 28 and 30, respectively, it is merely necessary to back the vehicle around the tank 22 with the front and rear lifting members 38 and 40 in their lower, extended positions. It will be noted that the rear lifting elements 72 are located at a lower elevation than the front lifting elements 70 when the front and rear lifting members 38 and 40 are in their extended positions, this difference in elevation corresponding to the aforementioned difference in elevation between the front rails 28 and the rear rails 30, the rear rails being at a lower elevation than the front rails. This arrangement permits the rear lifting elements 72 to pass under the front rails 28 on the tank 22 freely as the vehicle is backed into position around the tank.

The rails 64 interconnecting the front and rear lifting arms 42 and 46 are provided at their front ends with stops 74 which engage the front rails 28, or their means of attachment to the tank 22, as the vehicle is backed around the tank, to limit rearward movement of the vehicle relative to the tank when the latter is resting on the surface 24. These stops thus insure proper alignment of the front lifting elements 70 with the front rails 28 and of the rear lifting elements 72 with the rear rails 30.

Mounted on the rails 64 adjacent the front lifting elements 70 and the rear lifting elements 72 are front bracing elements 76 and rear bracing elements 78, respectively. The front and rear bracing elements 76 and 78 are spaced vertically upwardly from the front and rear lifting elements 70 and 72, respectively, and face generally inwardly of the vehicle so as to be engageable with the generally transversely outwardly facing front and rear bracing abutments 32 and 34, respectively, formed on the sides of the tank 22. To permit the bracing elements 76 and 78 to adapt themselves to the contours of the bracing abutments 32 and 34, the bracing elements 76 and 78 are flexibly mounted on the rails 64. In the construction illustrated, this is accomplished by mounting the bracing elements 76 and 78 on brackets 80 and 82, respectively, by pivots 84 and 86, respectively, which provide axes extending longitudinally of the vehicle.

As will be most clearly understood from Fig. 3 of the drawings, when movement of the lifting members 38 and 40 from their extended positions toward their retracted positions is initiated to move the lifting elements 70 and 72 into engagement with the respective lifting rails 28 and 30, the weight of the tank 22 is transferred to the side rails 12 through the lifting members 38 and 40 and tends to twist the side rails inwardly and downwardly toward each other, the transverse pivots 50 and 52 providing, in effect, rigid connections between the lifting members and the side rails insofar as such twisting tendencies of the side rails are concerned. However, actual inward and downward twisting of the side rails 12 toward each other is prevented by engagement of the bracing elements 76 and 78 with the bracing abutments 32 and 34, respectively, thereby rigidly transversely bracing or cross bracing the side rails 12 through the lifting members 38 and 40 and the tank 22. Thus, the tank 22 itself acts as a cross brace preventing twisting of the side rails 12, which is an important feature. The tank 22 also acts as a cross brace to prevent spreading of the side rails 12, or movement of the side rails toward each other, because of the hook-like configurations of the lifting elements 70 and 72. Thus, the side rails 12 are secured against transverse movement toward or away from each other through the lifting members 38 and 40 and the tank 22.

It will be noted that the foregoing cross bracing of the side rails 12 against inward and downward twisting movement thereof toward each other, and the foregoing cross bracing of the side rails against lateral movement toward or away from each other, take place at the instant that lifting of the tank is initiated, and while the lifting members 38 and 40 are still in their extended positions. Thus, the side rails 12 are cross braced against relative lateral movement and twisting movement while the tank is being lifted into its traveling position, as well as after it has been moved into its traveling position. Thus, the present invention, by, in effect, converting the U-shaped frame 10 into a rectangular frame from the instant that lifting of the tank 22 is begun, greatly increases both the lifting capacity and the load carrying capacity of the frame, which is an important feature of the invention.

It will be understood that while the bracing elements 76 and 78 have been shown as generally inwardly facing and as located above the lifting elements 70 and 72, respectively, this particular positioning of the bracing elements may be modified while still achieving the results outlined. In other words, it is merely necessary that the bracing elements 76 and 78 be spaced vertically or horizontally from the lifting elements 70 and 72, respectively, and that they face in such directions as to bear against suitable bracing abutments on the tank 22. For example, the bracing elements might be spaced horizontally inwardly from the lifting elements and face downwardly to achieve the same results.

While the foregoing cooperation between the rails 28 and 30 and the lifting elements 70 and 72 and between the bracing abutments 32 and 34 and the bracing elements 76 and 78 automatically transversely braces the side rails 12 to prevent relative transverse movement and twisting movement thereof, it is sometimes desirable to lock the rails 28 and 30 to the lifting elements 70 and 72 to eliminate any possibility of disengagement of the tank 22 from the lifting mechanisms 36, as when the vehicle of the invention is traveling over rough terrain. For this purpose, the rails 64 carry front and rear clamps 88 and 90 for clamping the rails 28 and 30, respectively, against the lifting elements 70 and 72, respectively. Referring particularly to Fig. 5, wherein one of the front clamps 88 is shown in detail, this clamp may simply include a clamping element 92 adapted to be brought into engagement with the corresponding front rail 28, to clamp the front rail between the clamping element 92 and the corresponding front lifting element 70, by a stud 94 provided with a handle 96, the stud being threaded into the corresponding rail 64. When not in use, the clamping element 92 may be pivoted aside about the axis of the stud 94, being brought into operative position only when transit conditions make locking the tank to the frame 10 advisable, as when traveling over rough terrain. The other front clamp 88 and the rear clamps 90 are identical to the clamp 88 shown in Fig. 5, and need not be described.

Figure 6:
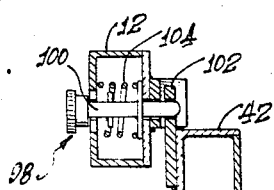
Fig. 6 is an enlarged, fragmentary sectional view taken along the arrowed line 6—6 of Fig. 1 of the drawings.

In order to prevent accidental movement of the lifting mechanisms 36 from their retracted positions to their extended positions during transit as a result, for example, of leakage of hydraulic fluid past the pistons of the hydraulic units 54, locking devices 98 for locking the front lifting members 38, for example, to the side rails 12 in their retracted positions may be provided. Referring to Fig. 6, each locking device 98 may simply include a locking pin 100 carried by the corresponding side rail 12 and insertable into an opening in a locking element 102 on the corresponding lifting member 38. Preferably, the locking pin is biased into its extended or operative position, wherein it is inserted into the locking element 102, by a compression spring 104. Thus, the locking devices 98 automatically lock the lifting mechanisms 36 in their retracted positions upon arrival of the lifting mechanisms at such positions.

Considering the over-all operation of the invention, after pivoting the clamping elements of the front and rear clamps 88 and 90 to inoperative positions and after releasing the locking devices 98 to permit movement of the lifting members 38 and 40 into their lower, extended positions, the vehicle is backed into position around the tank 22, resting on the surface 24, to position the tank between the side rails 12. The stops 74 limit rearward movement of the vehicle relative to the tank to align the front and rear lifting elements 70 and 72 with the front and rear lifting rails 28 and 30, respectively.

The foregoing accomplished, the hydraulic units 54 are energized in a direction to extend them, whereupon the lifting elements 70 and 72 move upwardly into engagement with the downwardly-facing lifting abutments provided by the lower sides of the front and rear rails 28 and 30, respectively.

Because of the hook-like configurations of the lifting elements 70 and 72, relative lateral movement thereof after they engage the rails 28 and 30, respectively, is prevented by the tank 22. Since the lifting members 38 and 40 are effectively rigidly connected to the side rails 12 with respect to transverse movement by the pivots 50 and 52, the side rails 12 are rigidly secured transversely against relative transverse movement. As soon as the lifting elements 70 and 72 engage the rails 28 and 30, respectively, the bracing elements 76 and 78 seat against the bracing abutments 32 and 34, respectively, to prevent the weight of the tank 22 applied to the lifting elements 70 and 72 from twisting the side rails 12 inwardly and downwardly toward each other, thereby rigidly cross bracing the side rails against twisting movement also. As hereinbefore pointed out, such cross bracing of the side rails 12 against relative lateral movement and twisting movement materially increases the lifting capacity of the frame 10 and the load transporting capacity thereof.

After the tank 22 has been lifted into its traveling position, the locking devices 98 latch the lifting mechanisms 36 in their retracted positions relative to the side rails 12 to prevent inadvertent dropping of the tank 22 in transit. If the vehicle is to travel over rough terrain, the clamps 88 and 90 may be set manually to eliminate any possibility of disengagement of the tank.

Although an exemplary embodiment of the present invention has been disclosed herein for purposes of illustration, it will be understood that various changes, modifications and substitutions may be incorporated in such embodiment without departing from the spirit of the invention as defined by the claims which follow.

I claim as my invention:

1. In a pickup vehicle, the combination of: a generally U-shaped frame including two transversely spaced side frame members interconnected at one end of said frame; a separate, detachable load carrier receivable between said side frame members; lifting means on said frame and engageable with said load carrier for lifting said load carrier into a traveling position between said side frame members; and bracing means engageable with said load carrier upon engagement of said lifting means with said load carrier for rigidly transversely bracing said side frame members through said load carrier upon initiation of lifting of said load carrier by said lifting means.

2. In a pickup vehicle, the combination of: a generally U-shaped frame including two transversely spaced side frame members interconnected at one end of said frame; a separate, detachable load carrier receivable between said side frame members; two lifting means movably mounted on said side frame members, respectively, and engageable with said load carrier for lifting said load carrier into a traveling position between said side frame members, said lifting means being movable generally vertically relative to said side frame members from extended positions to retracted positions to lift said load carrier into its traveling position; two bracing means on said lifting means, respectively, and engageable with said load carrier in response to movement of said lifting means from their extended positions toward their retracted positions, for rigidly transversely bracing said lifting means through said load carrier to rigidly transversely brace said side frame members through said lifting means and said load carrier; and means for moving said lifting means between their extended and retracted positions.

3. In a pickup vehicle, the combination of: a generally U-shaped frame including two transversely spaced side frame members interconnected at one end of said frame; a separate, detachable load carrier receivable between said side frame members; two lifting means movably mounted on said side frame members, respectively, and engageable with said load carrier for lifting said load carrier into a traveling position position between said side frame members, said lifting means being movable generally vertically relative to said side frame members from extended positions to retracted positions to lift said load carrier into its traveling position, said lifting means respectively including lifting members respectively having thereon lifting elements engageable with said load carrier; two bracing means on said lifting means, respectively, and engageable with said load carrier in response to movement of said lifting means from their extended positions toward their retracted positions, for rigidly transversely bracing said lifting means through said load carrier to rigidly transversely brace said side frame members through said lifting means and said load carrier, said bracing means respectively including bracing elements respectively flexibly mounted on said lifting members and engageable with said load carrier; and means for moving said lifting means between their extended and retracted positions.

4. In a pickup vehicle, the combination of: a generally U-shaped frame including two transversely spaced side frame members interconnected at one end of said frame; a separate, detachable load carrier receivable between said side frame members and provided with transversely spaced, downwardly facing abutments; two lifting means movably mounted on said side frame members respectively, and engageable with said abutments, respectively, for lifting said load carrier into a traveling position between said side frame members, said lifting means being movable generally vertically relative to said side frame members from extended positions to retracted positions to lift said load carrier into its traveling position, said lifting means respectively including lifting members respectively having thereon lifting elements respectively insertable under and engageable with said abutments; two bracing means on said lifting means, respectively, and engageable with said load carrier in response to movement of said lifting means from their extended positions toward their retracted positions, for rigidly transversely bracing said lifting means through said load carrier to rigidly transversely brace said side frame members through said lifting means and said load carrier, said bracing means respectively including inwardly facing bracing elements respectively mounted on said lifting members above said lifting elements and seatable against said load carrier; and means for moving said lifting means between their extended and retracted positions.

5. In a pickup vehicle, the combination of: a generally U-shaped frame including two transversely spaced side frame members interconnected at one end of said frame; a separate, detachable load carrier receivable between said side frame members and provided with transversely spaced, downwardly facing abutments; two lifting means movably mounted on said side frame members respectively, and engageable with said abutments, respectively, for lifting said load carrier into a traveling position between said side frame members, said lifting means being movable generally vertically relative to said side frame members from extended positions to retracted positions to lift said load carrier into its traveling position, said lifting means respectively including lifting members respectively having thereon lifting elements respectively insertable under and engageable with said abutments, said lifting members being pivotally mounted on said side frame members by pivot means providing pivot axes extending transversely of said frame; two bracing means on said lifting means, respectively, and engageable with said load carrier in response to movement of said lifting means from their extended positions toward their retracted positions, for rigidly transversely bracing said lifting means through said load carrier to rigidly transversely brace said side frame members through said lifting means and said load carrier, said bracing means respectively including inwardly facing bracing elements respectively mounted on said lifting members above said lifting elements and seatable against said load carrier; and means for moving said lifting means between their extended and retracted positions.

6. In a pickup vehicle, the combination of: a generally U-shaped frame including two transversely spaced side frame members interconnected at one end of said frame; a separate, detachable load carrier receivable between said side frame members and provided with transversely spaced, downwardly facing abutments; two lifting means movably mounted on said side frame members respectively, and engageable with said abutments, respectively, for lifting said load carrier into a traveling position between said side frame members, said lifting means being movable generally vertically relative to said side frame members from extended positions to retracted positions to lift said load carrier into its traveling position, said lifting means respectively including lifting members respectively having thereon lifting elements respectively insertable under and engageable with said abutments, said lifting members being pivotally mounted on said side frame members by pivot means providing pivot axes extending transversely of said frame; two bracing means on said lifting means respectively, and engageable with said load carrier in response to movement of said lifting means from their extended positions toward their retracted positions, for rigidly transversely bracing said lifting means through said load carrier to rigidly transversely brace said side frame members through said lifting means and said load carrier, said bracing means respectively including inwardly facing bracing elements respectively flexibly mounted on said lifting members above said lifting elements and seatable against said load carrier; and means for moving said lifting means between their extended and retracted positions.

7. In a pickup vehicle, the combination of: a generally U-shaped frame including two transversely spaced side frame members interconnected at one end of said frame; a separate, detachable load carrier receivable between said side frame members and provided with transversely spaced, downwardly facing abutments; two lifting means movably mounted on said side frame members respectively, and engageable with said abutments, respectively, for lifting said load carrier into a traveling position between said side frame members, said lifting means being movable generally vertically relative to said side frame members from extended positions to retracted positions to lift said load carrier into its traveling position, said lifting means respectively including lifting members respectively having thereon lifting elements respectively insertable under and engageable with said abutments, said lifting members being pivotally mounted on said side frame members by pivot means providing pivot axes extending transversely of said frame; two bracing means on said lifting means, respectively, and engageable with said load carrier in response to movement of said lifting means from their extended positions toward their retracted positions, for rigidly transversely bracing said lifting means through said load carrier to rigidly transversely brace said side frame members through said lifting means and said load carrier, said bracing means respectively including inwardly facing bracing elements respectively flexibly mounted on said lifting members above said lifting elements and seatable against said load carrier, said bracing elements being flexibly mounted on said lifting members, respectively, by pivot means having pivot axes extending longitudinally of said frame; and means for moving said lifting means between their extended and retracted positions.

8. In a pickup vehicle, the combination of: a generally U-shaped frame including two transversely spaced side frame members interconnected at one end of said frame; a separate, detachable load carrier receivable between said side frame members and provided with transversely spaced, downwardly facing abutments; ground-engaging wheels supporting said frame and on which said frame may be maneuvered relative to said load carrier into a position wherein said side frame members receive said load carrier therebetween; two lifting means movably mounted on said side frame members respectively, and engageable with said abutments, respectively, for lifting said load carrier into a traveling position between said side frame members, said lifting means being movable generally vertically relative to said side frame members from extended positions to retracted positions to lift said load carrier into its traveling position, said lifting means respectively including lifting members respectively having thereon lifting elements respectively insertable under and engageable with said abutments, said lifting members being pivotally mounted on said side frame members by pivot means providing pivot axes extending transversely of said frame; two bracing means on said lifting means, respectively, and engageable with said load carrier in response to movement of said lifting means from their extended positions toward their retracted positions, for rigidly transversely bracing said lifting means through said load carrier to rigidly transversely brace said side frame members through said lifting means and said load carrier, said bracing means respectively including inwardly facing bracing elements respectively flexibly mounted on said lifting members above said lifting elements and seatable against said load carrier, said bracing elements being flexibly mounted on said lifting members, respectively, by pivot means having pivot axes extending longitudinally of said frame; and means for moving said lifting means between their extended and retracted positions.

9. In a pickup trailer, the combination of: a generally U-shaped frame including two transversely spaced side frame members interconnected at one end of said frame; a trailer hitch connected to said one end of said frame; a separate, detachable load carrier receivable between said side frame members and provided with transversely spaced, downwardly facing abutments; ground-engaging wheels supporting said frame and on which said frame may be maneuvered relative to said load carrier into a position wherein said side frame members receive said load carrier therebetween; two lifting means movably mounted on said side frame members respectively, and engageable with said abutments, respectively, for lifting said load carrier into a traveling position between said side frame members, said lifting means being movable generally vertically relative to said side frame members from extended positions to retracted positions to lift said load carrier into its traveling position, said lifting means respectively including lifting members respectively having thereon lifting elements respectively insertable under and engageable with said abutments, said lifting members being pivotally mounted on said side frame members by pivot means providing pivot axes extending transversely of said frame; two bracing means on said lifting means, respectively, and engageable with said load carrier in response to movement of said lifting means from their extended positions toward their retracted positions, for rigidly transversely bracing said lifting means through said load carrier to rigidly transversely brace said side frame members through said lifting means and said load carrier, said bracing means respectively including inwardly facing bracing elements respectively flexibly mounted on said lifting members above said lifting elements and seatable against said load carrier, said bracing elements being flexibly mounted on said lifting members, respectively, by pivot means having pivot axes extending longitudinally of said frame; and means for moving said lifting means between their extended and retracted positions.

10. In a pickup vehicle, the combination of: a generally U-shaped frame including two transversely spaced side frame members interconnected at one end of said frame; two lifting members mounted on said side frame members, respectively, for generally vertical movement relative thereto, said lifting members respectively having thereon upwardly-facing lifting elements; laterally-facing bracing elements carried by said lifting members, respectively, and spaced laterally from said lifting elements, respectively; and means for moving said lifting members generally vertically relative to said side frame members.

11. In a pickup vehicle, the combination of: a generally U-shaped frame including two transversely spaced side frame members interconnected at one end of said frame; two lifting members mounted on said side frame members, respectively, for generally vertical movement relative thereto, said lifting members respectively having thereon upwardly-facing lifting elements; laterally-facing bracing elements carried by said lifting members, respectively, and spaced laterally from said lifting elements, respectively, said bracing elements facing inwardly toward each other and being located above said lifting elements, respectively; and means for moving said lifting members generally vertically relative to said side frame members.

12. A pickup vehicle as defined in claim 2 wherein each of said lifting means includes two lifting members pivotally connected to the corresponding one of said side frame members at longitudinally spaced points by pivot means having pivot axes extending transversely of said frame, each of said lifting means including means pivotally interconnecting said lifting members thereof.

13. In a pickup vehicle, the combination of: a generally U-shaped frame including two transversely spaced side frame members interconnected at one end of said frame; a separate, detachable load carrier receivable between said side frame members; two lifting means movably mounted on said side frame members, respectively, and engageable with said load carrier for lifting said load carrier into a traveling position between said side frame members, said lifting means being movable generally vertically relative to said side frame members from extended positions to retracted positions to lift said load carrier into its traveling position, and said lifting means respectively including lifting members respectively having thereon upwardly facing lifting elements engageable with said load carrier; two bracing means on said lifting means, respectively, and engageable with said load carrier in response to movement of said lifting means from their extended positions toward their retracted positions, for rigidly transversely bracing said lifting means through said load carrier to rigidly transversely brace said side frame members through said lifting means and said load carrier, said bracing means respectively including bracing elements respectively carried by said lifting members and engageable with said load carrier, said bracing elements being spaced from said lifting elements, respectively, and facing in directions such that engagement thereof with said load carrier when said lifting elements are in engagement with said load carrier prevents inward and downward twisting of said side frame members toward each other; and means for moving said lifting means between their extended and retracted positions.

References Cited in the file of this patent

UNITED STATES PATENTS

| | | |
|---|---|---|
| 1,239,771 | Collis | Sept. 11, 1917 |
| 2,230,014 | Raven | Jan. 28, 1941 |
| 2,672,247 | Jewett | Mar. 16, 1954 |
| 2,701,648 | McBath | Feb. 8, 1955 |
| 2,762,514 | McGinn | Sept. 11, 1956 |